(12) United States Patent
Dinh et al.

(10) Patent No.: US 12,442,703 B2
(45) Date of Patent: Oct. 14, 2025

(54) EXPLOSIVE BLOCK DROP TEST DEVICE

(71) Applicant: VIETTEL GROUP, Ha Noi (VN)

(72) Inventors: Xuan Bang Dinh, Ha Noi (VN); Van Loi Nguyen, Yen My District (VN); Tan Hai Dang, Ha Noi (VN)

(73) Assignee: VIETTEL GROUP, Ha Noi (VN)

( * ) Notice: Subject to any disclaimer, the term of this patent is extended or adjusted under 35 U.S.C. 154(b) by 286 days.

(21) Appl. No.: 18/240,661

(22) Filed: Aug. 31, 2023

(65) Prior Publication Data

US 2024/0094076 A1   Mar. 21, 2024

(30) Foreign Application Priority Data

Sep. 19, 2022   (VN) .............................. 1-2022-06011

(51) Int. Cl.
  *G01L 5/00*   (2006.01)
  *G01M 7/08*   (2006.01)
  *G01N 19/00*   (2006.01)

(52) U.S. Cl.
  CPC ............. *G01L 5/0052* (2013.01); *G01M 7/08* (2013.01); *G01N 19/00* (2013.01)

(58) Field of Classification Search
  None
  See application file for complete search history.

(56) References Cited

U.S. PATENT DOCUMENTS 11,761,865 B2 * 9/2023 Liu .......................... G01N 3/12
                                                        73/788

FOREIGN PATENT DOCUMENTS

CN            113324858 A  *  8/2021  ............... G01N 3/02

* cited by examiner

*Primary Examiner* — Peter J Macchiarolo
*Assistant Examiner* — Jermaine L Jenkins
(74) *Attorney, Agent, or Firm* — patenttm.us

(57) ABSTRACT

The invention relates to an explosive mass drop test device. Specifically, the present invention relates to a method of designing an explosive block drop test device to serve the explosion test process and meet the requirements for ensuring safety during the test. The present invention gives an example of a test device for dropping explosive masses in the range 50-300 kg. In addition, the structure is designed to be simple, easy to integrate and disassemble with the explosive block, the manipulation of dropped objects is simplified. The product of the present invention can be used to test the safety of explosive blocks.

1 Claim, 6 Drawing Sheets

EXPLOSIVE BLOCK DROP TEST DEVICE

SCOPE OF THE INVENTION

The present invention relates to a drop test device for products with built-in flammable and explosive materials (collectively, explosive blocks). Specifically, the explosive drop test device mentioned in the present invention is applicable to the drop test of explosives.

GENERAL DESCRIPTION

Among the published patent documents, some are related to heavy material dropping mechanisms. However, the related inventions still have some shortcomings or limitations, such as:

U.S. Pat. No. 6,654,990B2 refers to a quick release hook consisting of a latch padlock, a spring, a pair of latch hooks, a pull rod and a main body. One end of the latch padlock is cylindrical and the other end is block shaped. Manually loaded hook-clamp release is actuated by removing the first safety pin/clamp. This is done by hand (directly by hand) or by a zipper attached to the spring-loaded safety pin; i.e. remote and secure remotely. The safety clamp release cord can be activated from any direction. When the safety lock has been removed, the hook is in a loaded state and the operator pulls the rope attached to the release lever to drop it. The requirement for the maneuver that the pull on the release rope connected to the end of the release lever also means that the operator can safely drop the load out of the "danger zone". Straps used to sling the test item can be activated "directly" in any direction within a plane perpendicular to 90 degrees and parallel to the load current. The "standard" release jaw can also be operated from above the load with the use of a suitable pulley; The effective pulling angle is in the range from −90 degrees to 90 degrees relative to the horizontal plane.

Quick-release hook can release the load with or without the load on the equipment. (provided that the safety latch is removed). It is not required to use the clamp to secure the device in the locked position.

When withdrawing the safety pin, the operator must jerk to release the latch from the latch body and the connecting block.

The jerking action is appropriate for the distance the operator stands near the position of the clamp.

When the mass of the dropped object is large, the pulling force without the support mechanism is not enough to drop the explosive block.

To overcome the above limitations, the authors propose an explosive block drop test device unlike any other published invention.

SUMMARY OF THE INVENTION

The purpose of the present invention is to propose an explosive mass drop test device, which includes a description of the components of an explosive mass drop test device to ensure the safety of the operator of the device in an area away from residential areas. suitable for the location of the shooting range.

To achieve the above purpose, the authors propose to design an explosive block drop device consisting of three parts:
Installation platform
Load-Bearing Structure
Explosive block drop mechanism In this invention, the authors describe an explosive block drop test device suitable for explosive blocks with mass from 50 to 300 kg, dropping height from 0.5 m to 3 m for the purpose of evaluating the fire safety of explosive blocks when transported from the place of production to the location and installation location.

In fact, explosive blocks are more likely to experience a free fall situation during careless transportation. Therefore, this is a mandatory requirement for explosive blocks to ensure that they will not explode when dropped unexpectedly during transportation. In addition, the test is also used to demonstrate the minimum robustness when evaluating safety requirements.

In this invention, the contact plane when dropped is a steel plate on a concrete base;

In the present invention, the distance from the lowest point of the container of explosive mass to the contact plane when dropped is: 1.5-3 m;

In the present invention, the drop method shall ensure that the explosive block container falls freely from the suspended position, with minimal resistance at the time of release.

In this invention, the operator controls the drop process from a position from 90 to 150 m away from the drop position, the implementation of which requires speed and safety.

In this invention, the drop-off process needs to be easily implemented in the conditions of the explosion test range far from a residential area without 220V or 3-phase power, only the control current from the battery.

In this invention, when a safety failure occurs (explosive block explodes when dropped during testing), implementation personnel and facilities that are not greatly affected can recover quickly.

The product of the present invention can be applied in the process of dropping explosives according to several Military standards such as MIL-STD-810H, MIL-STD-331D etc.

DETAILED DESCRIPTION

Figure 1:
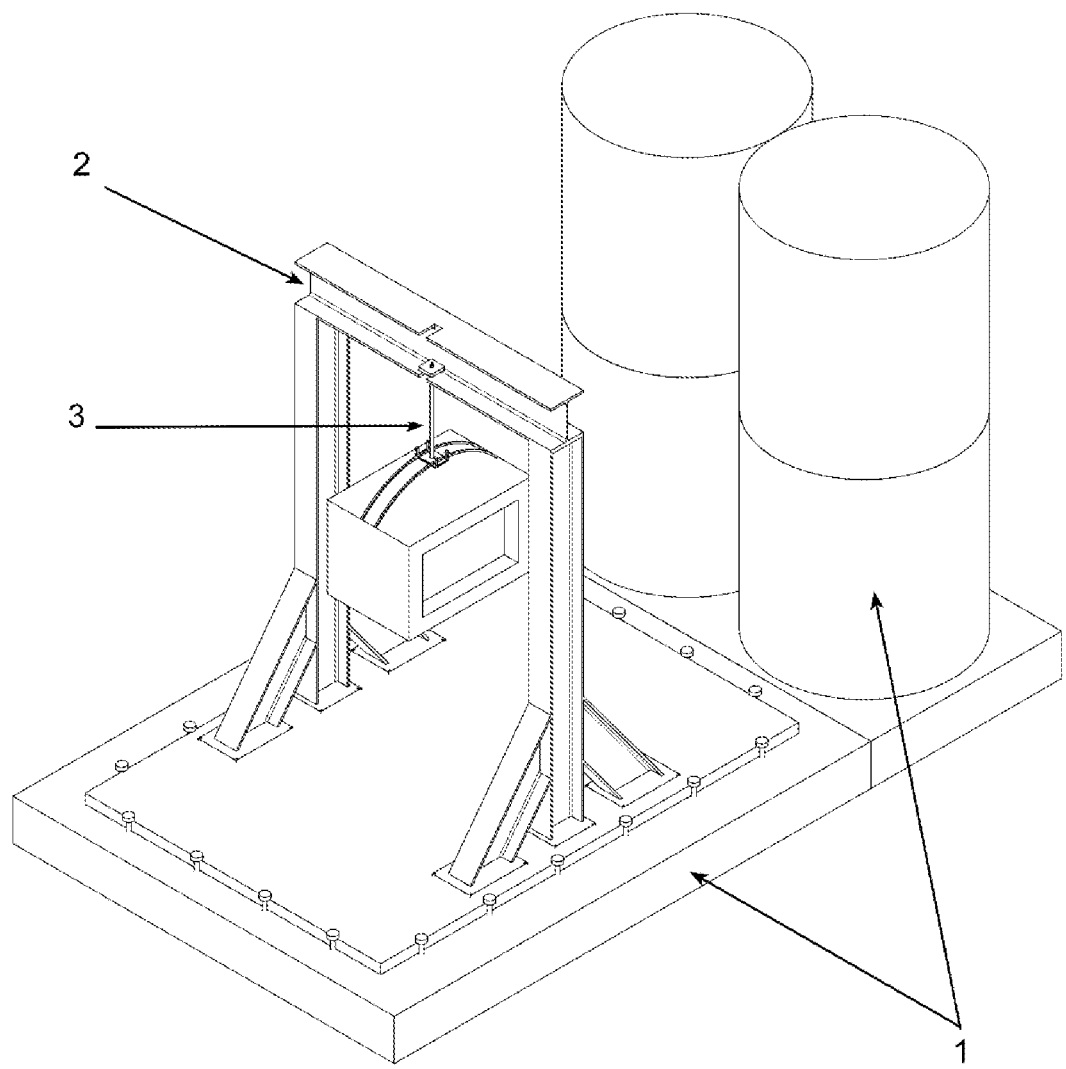
FIG. 1 shows an overview of the explosive mass drop test equipment.
Figure 2:
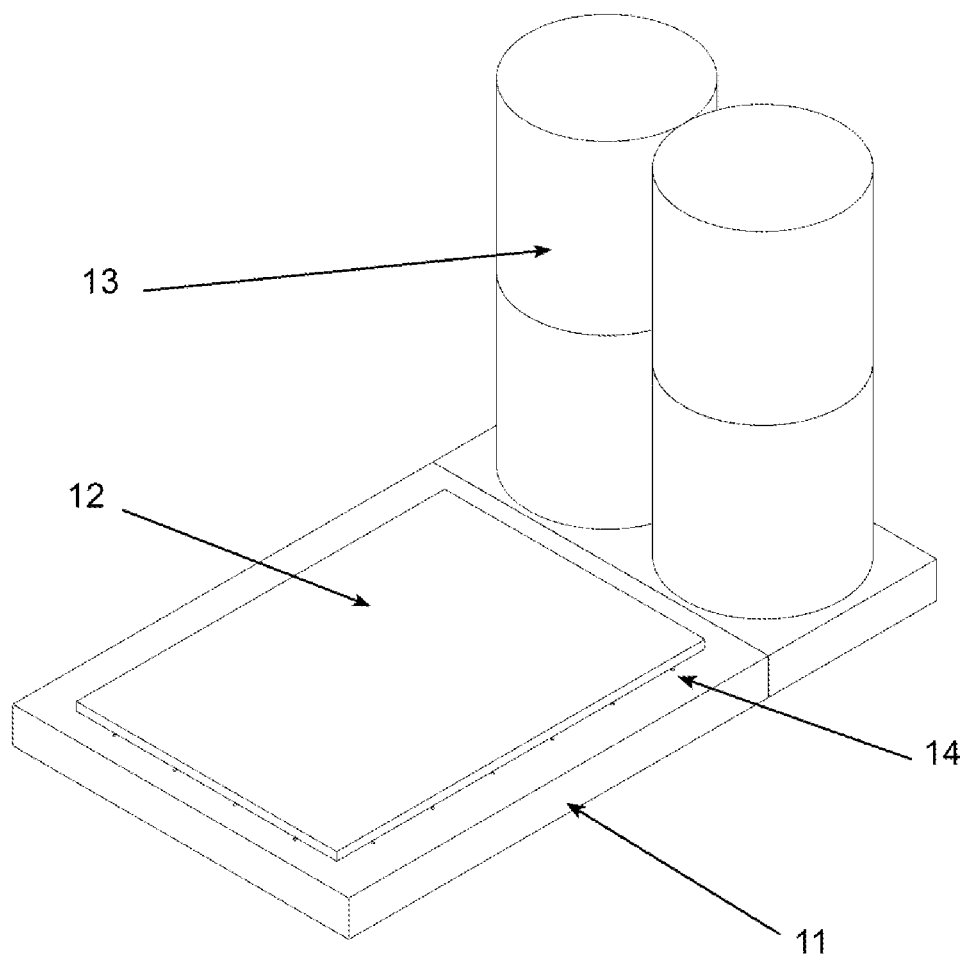
FIG. 2 is a drawing depicting the structure of the base assembly.

The explosive mass drop test device proposed in the present invention consists of the main assemblies of Installation platform 1, Load-Bearing Structure 2, and Explosive block drop mechanism 3. The scheme presented in the detailed description below is an example for the dropping of explosives with a mass of 50-300 kg. As follows:

Installation Platform 1

Installation platform 1 of explosive block drop test device includes the following components: concrete foundation 11, steel plate 12, debris block 13, bolts to reinforce the structure 14. In there:

Concrete foundation 11 is poured on the ground that has been treated to ensure firmness, no subsidence when pouring concrete. The process of pouring concrete with steel beams, using concrete grade 400 with durability level B30 and compressive strength≥51.37 MPa. Concrete foundation 11 is composed of concrete blocks with dimensions of 5000×2800 mm (±5%) with a depth of 300 mm (±5%). Steel beams on concrete 11 are mounted and arranged with L-bars with one bolt head, the positions of the bolts correspond to the connection holes on the code plate 23 of the bracket assembly 2. The bolts have a durability level of 8.8 or higher, the bolt diameter is 30 mm.

Steel plate 12 is made up of steel plate with an average thickness of 70 mm (±5%) with an area of 3100×2200 mm (±10%). Steel plate 12 is attached to concrete base 11 through a mechanism of fifteen sets of retaining bolts 14 with external thread.

Bolts to reinforce the structure 14 to fix steel plate 12 to concrete base 11 is a standard mechanical part with a diameter of 1 inch, selected thread pitch suitable to fix steel plate 12 to concrete foundation 11.

Explosive fragmentation block 13: consists of four blocks, made from concrete, cylindrical structure, diameter 1300 mm (±5%), height 1400 mm (±5%), the outer ring is reinforced concrete, the core of the block is concrete grade 250 or higher with durability grade B30 and compressive strength≥51.37 MPa.

Load-Bearing Structure 2

Figure 3:
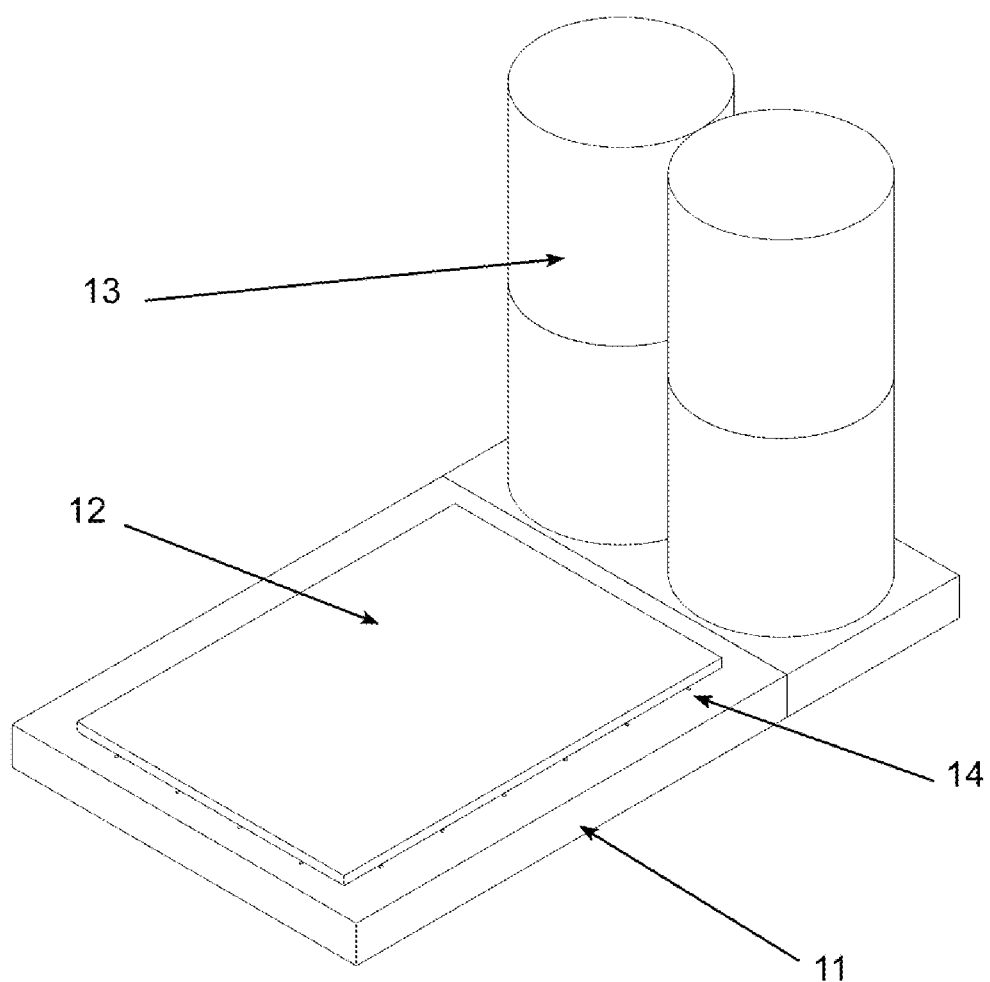
FIG. 3 is a drawing depicting the structure of the price frame cluster.

Load-Bearing Structure 2 of explosive block drop test devices, refer to FIG. 3, including components such as load-bearing frame 21, suspension rod 22. These components have the following manufacturing parameters;

The bearing frame 21 and the hanging bar 22 are welded structures with an envelope size (width×height) of 1900× 2800 mm (±5%). The bearing frame 21 and the hanging bar 22 are made from H-shaped welded structural steel beams (HSWS) according to ISO 657-16:1980, JIS 3192:2014 with a thickness of t2=20 mm. On hanger 22, at the midpoint of the bar, cut out the groove to install the hanging rod with a width of 20 mm and a depth of 100 mm.

Load-Bearing Structure 21 connects to the foundation through connections using six gusset plates 23. The gusset plates 23 made from steel plates of common steel grades such as CT3, SS400, A36. Steel thickness 20 mm (±5%). On the face of each gusset plates 23 drill four holes for mounting with anchor bolts that are attached to the steel beam fixed during concrete pouring 11.

Through simulation, the Load-Bearing Structure 2 can hang falling objects from 50-300 kg without deformation.

The steel beams are connected by welding method.

Drop Mechanism Assembly 3

Figure 4:
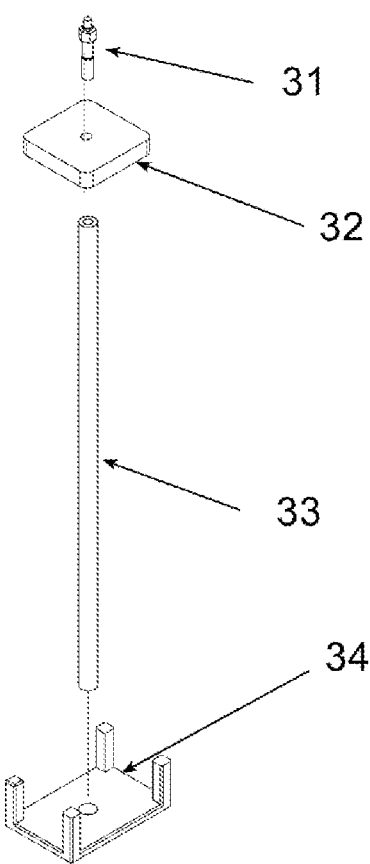
FIG. 4 is a drawing depicting the structure of the drop mechanism assembly.
Figure 5:
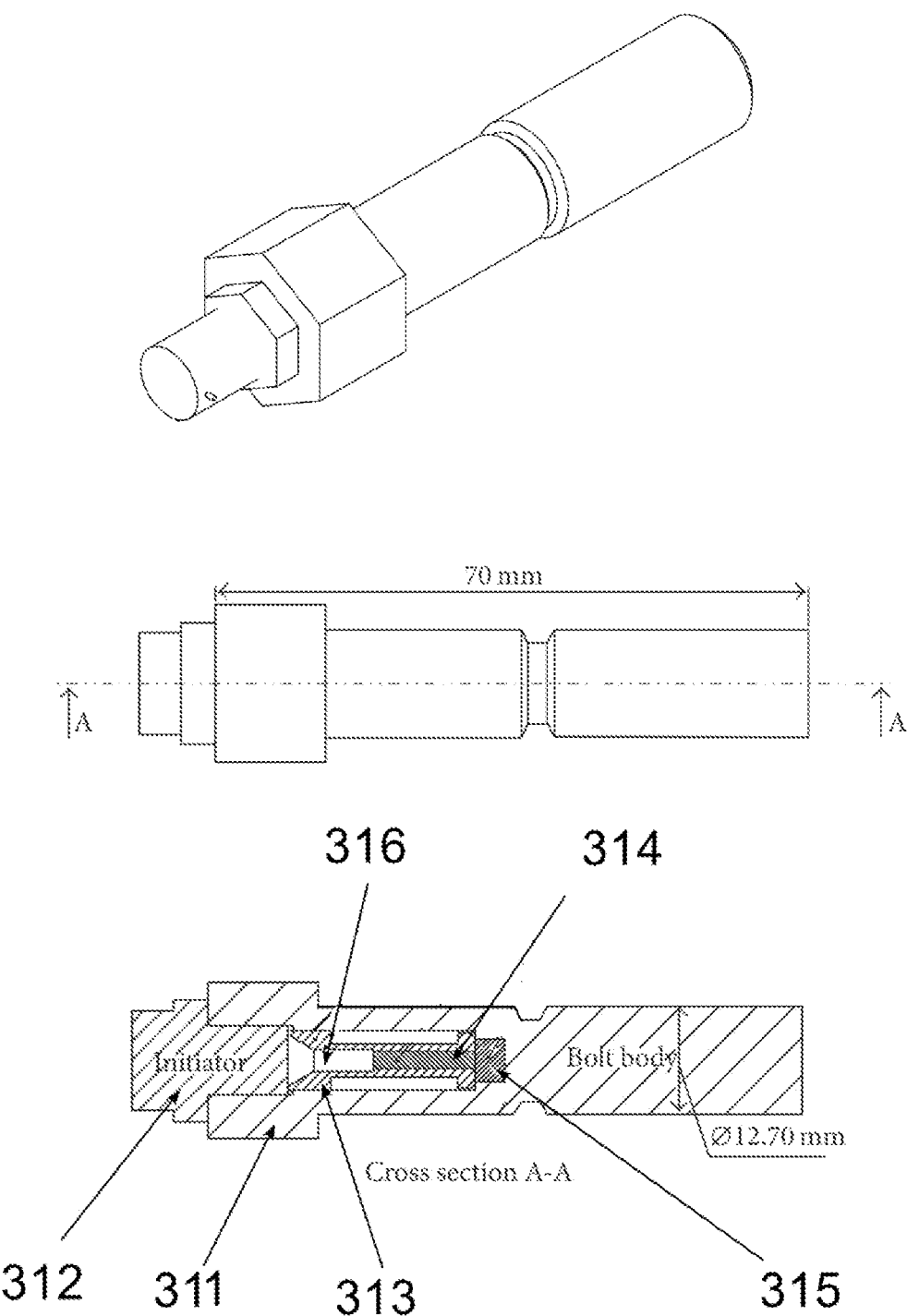
FIG. 5 is a drawing depicting the structure of explosive bolts.

Drop mechanism assembly 3 has the function of hanging the device and free-dropping the device from the hanging position to the drop surface, refer to FIG. 4, including components such as control bolt 31, mounting plate 32, suspension rod 33, wire hook 34. In which:

Control bolt 31 is a device with the function of effectively fixing two objects and separating them by explosive force precisely in the presence of detonation voltage. This 31 control bolt can precisely control the moment of drop. This unit is designed for rocket, spaceship and marine applications. Control bolt 31 is shown in FIG. 5, including components: bolt body 311, initiator 312, explosive sleeve 313, explosive (RDX, 315); PETN (314) In which:

Bolt body 311 is made of 17-4PH stainless steel. The length of the bolt body is 70 mm. The thread is ½ inch (12.7 mm) in diameter and 26.6 mm long.

The initiator 312 is made from 17-4PH stainless steel, the fuse used is ZPP (zirconium-potassium perchlorate) used to detonate the explosive mounted in the bolt.

Explosive is a mixture of explosives RDX (hexogen, $C_3H_6N_6O_6$)) 315; PETN (penthrite, $C_5H_8N_4O_{12}$) 314 and in conjunction with priming material (LA, Lead azide). RDX with the legal name, cyclotrimethylene-trinitramine, cyclonite, T4 is an explosive widely used in military and industrial applications. small ammunition, it is now used as the explosive later in the detonator, used as the core drug of the detonation line. Lead azide with the formula $(Pb(N_3)_2)$ is an explosive, used as a detonator, as a primer in detonators. In its white crystalline form it has a packing density of 4.71 g/cm$^3$. Lead azide is instantly flammable for an explosive transition, which means that even a small amount is fully explosive.

Assembly proceeds as follows: first, 120 mg of RDX is loaded onto the bolt body 311. Then a explosive sleeve 312 is assembled and 56 mg of PETN is stuffed followed by 50 mg of priming material (Lead Azide) stuffed until the explosive sleeve is filled. Then the bait is connected.

The mass of the suspension is determined based on the allowable stress at the cross-section at the narrowest position of the control bolt 31.

$$P \le \frac{210 \times S}{1.5 \times g}(\text{kg})$$

Where: S is the cross-sectional area of the bolt (mm$^2$); g is the free fall acceleration; 1.5 is the factor of safety; 210 is the mean tensile stress of stainless steel (210 MPa).

Control bolt 31 is a device for remote excitation with voltage of 12-30V; ≥1.5 A current has the advantage of simple fabrication and high reliability during drop testing.

Working voltage: 12-28V;

Burner bridge resistance: 1-2 Ohm;

Trigger time: 5 ms;

Safe current for each burner bridge: 20 mA.

Mounting plate 32 is made from steel plates of common steel grades such as CT3, SS400, A36. Steel thickness 20 mm, size mounting plate 32 is 100×300 mm±5%. At the center of mounting plate 32 drill a hole $14_{-0.5}^{0}$ mm so that the threaded part and the cylindrical part of the bolt body can be penetrated. The use of mounting plate 32 is to evenly distribute the weight of the drop mechanism assembly and the explosive block container to both sides of the groove where the suspension bar is installed.

Suspension rod 33 is a bar that is from cylindrical billet steel with a diameter of 20 mm to 30 mm. Fabrication materials are common steel such as CT3, SS400, A36. Threaded rods are available in lengths of 700 mm to 800 mm. One end of suspension rod 33 has an internal threaded hole of 12.7 mm diameter, 50 mm depth, one end is threaded with an outer diameter of 20 mm to 30 mm, length from 500 mm to 600 mm, the inner thread of the rod 33 is attached to the control bolt 31 and the outer thread of the 33 is attached to the wire hanger 34. The simplest manufacturing method is to make the rod containing the inner thread and the rod containing the separate external thread.

Figure 6:
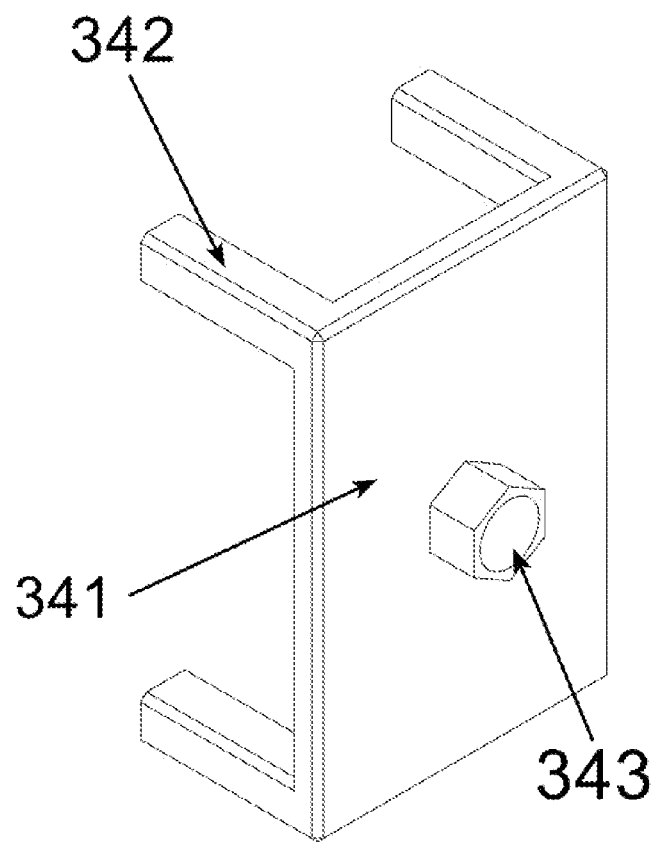
FIG. 6 is a drawing depicting the structure of a wire hanger.

Wire hanger 34 reference FIG. 6 includes rope hanger compartment 341, rope retainer 342, adjusting screw 343. Wire hanger compartment 341 is made of sheet steel 10 mm±5% thickness 150×200 mm±5%. In the middle of the wire hanger 341, a hole is drilled with a diameter 5 mm±5% larger than the rod diameter.

At the four corners of the compartment, there are four 342 wire retaining edges made from bar steel of common steel grades such as CT3, SS400, A36, size 10×10 mm±5%, 50 mm±5% high at four corners to hang the explosives container. Four lugs 342 attach to the wire hanger 341 by soldering Four lugs.

Position setter 343 made of tool steel has an internal thread to match the external thread of the rod 33. The position setter 343 attaches to the 341 wire hanger by welding.

When it is necessary to change the position relative to the sling, rotate the wire hanger along the sling bar to adjust the distance from the bottom of the explosive block container to the ground. The whole finished wire hanger is painted with anti-rust paint.

The invention claimed is:

1. Explosive mass drop test equipment comprises: a base assembly: including the following components: a concrete foundation, a steel plate, a blast block, retaining bolts; wherein: the concrete foundation: employing concrete grade 400 (MPa) with durability level B30 and compressive strength≥51.37 Mpa; the concrete foundation is made from concrete block size 5000×2800 mm (±5%) with depth of 300 mm (±5%); steel beams on concrete are mounted and arranged with L-bars with one bolt head, the positions of the bolts correspond to connection holes on a code plate of a bracket assembly; bolts with durability grade of 8.8 or higher, bolt diameter is 30 mm; the steel plate: with an average thickness of 70 mm (±5%) with an area of 3100×2200 mm (±10%); the steel plate is attached to the concrete base through a mechanism of fifteen sets of externally threaded retaining bolts; the retaining bolts: fixing the steel plate to the concrete base having a diameter of 1 inch, selected with a suitable thread to fix the steel plate to the concrete foundation; an explosion-splitting block: consists of four blocks, made of concrete, cylindrical structure, diameter 1300 mm (±5%), height 1400 mm (±5%), an outer rim is reinforced concrete, a core of the block is concrete grade 250 or higher with strength B30 and compressive strength≥51.37 MPa; a load-bearing frame and a suspension bar are welded structures with dimensions (width×height) of 1900×2800 mm (±5%); the load-bearing frame and suspension bar are made from H-shaped welded structural steel beams (HSWS) according to ISO 657-16:1980, JIS 3192:2014 standard with thickness $t_2$=20 mm; on the hanger, at the center of the suspension bar a cut out groove is provided to install a hanging rod with a width of 20 mm and a depth of 100 mm; the load-bearing frame is connected to the concrete foundation through connections using a system of six ciphertexts; the ciphertexts are made from steel plates of common steel grades such as CT3, SS400, A36; steel thickness 20 mm; on the face of each steel plate, four holes are drilled for mounting with anchor bolts attached to the fixed steel beams during the pouring of concrete; drop mechanism assembly: including components comprising control bolts, mounting plates, hanging rods, wire hangers; wherein at least one of the control bolts comprises: a device with the function of effectively fixing two objects and separating them by explosive force precisely when there is a detonation voltage; this control bolt precisely controls the moment of drop; this unit is designed for rocket, spaceship and marine applications; control bolt includes components: a bolt body, an explosive sleeve, a detonator, an explosive; wherein: the bolt body: made of 17-4PH stainless steel, length of bolt body 70 mm; the threaded part is ½ inch (12.7 mm) in diameter and 26.6 mm long; initiator: made of 17-4PH stainless steel, the fuse used is ZPP (zirconium-potassium perchlorate) used to detonate the explosive mounted in the bolt; the explosive: is a mixture of explosives (type RDX and PETN) in conjunction with priming material (type (Lead azide); RDX has the legal name, cyclotrimethylene-trinitramine, cyclonite, T4) is an explosive widely used in military and industrial applications; PETN, legal name pentaerythritol tetranitrate, common name: penthrite; chemical formula: $C(CH_2ONO_2)_4$) is used as the explosive conductor and main explosive of small ammunition, now it is used as the following explosive in the detonator, used as a core drug of a detonation line; lead azide with the formula $(Pb(N3)2)$ is an explosive, used as a detonator, as a primer in detonators; in white crystalline form it has a packing density of 4.71 $g/cm^3$; lead azide is instantly flammable for explosive transitions; a mounting plate: is made from steel plates of common steel grades such as CT3, SS400, A36; c. steel thickness 20 mm, size of the mounting plate is 100×300 mm±5%; t, at the center of the mounting plate drill a hole mm so that the threaded part and the cylindrical part of the bolt body can be penetrated, the use of the mounting plate is to evenly distribute the weight of the drop mechanism assembly and the explosive block container to both sides of the groove where the suspension bar is installed; the suspension bar: is from cylindrical billet steel with diameter from 20 mm to 30 mm; fabrication materials are common steel such as CT3, SS400, A36; threaded rods with a length of 700 mm to 800 mm; one end of the sling has an internal threaded hole of 12.7 mm diameter 50 mm depth, one end is threaded from 20 mm to 30 mm in diameter, 500 mm to 600 mm in length, the inner threaded end of the sling attaches to the control bolt and the outer threaded end of the sling attaches the wire hanger; a rope hanger: including a wire hanger, a rope holder, a position screw; wherein a hanger compartment made of sheet steel 10 mm±5% thickness 150×200 mm±5%; there is a hole in the middle of the wire hanger with a diameter 5 mm±5% larger than the rod diameter; at the four corners of a cavity, there are four wire retaining edges made of bar steel of common steel grades such as CT3, SS400, A36 with size 10×10 mm±5%, height 50 mm±5% at four corners for hanging the explosives container; four wire retainers are attached to the wire hanger by welding the four second retainers; an adjusting screw made of tool steel with an internal thread to match the external thread of the hanger; the adjusting screw attaches to the wire hanger by welding.

\* \* \* \* \*